Sept. 13, 1955  F. E. HOLLOMAN  2,717,410
COMBINED CASTER CUP AND SLIDE
Filed Nov. 13, 1953

INVENTOR
Forrest Edward Holloman

United States Patent Office 2,717,410
Patented Sept. 13, 1955

2,717,410

COMBINED CASTER CUP AND SLIDE

Forrest Edward Holloman, San Antonio, Tex.

Application November 13, 1953, Serial No. 392,019

1 Claim. (Cl. 16—29)

This invention relates to improvement in caster cups that are commonly used to prevent injury to finished floors, rugs and asphalt tile by the continued pressure of the casters of beds and heavy pieces of furniture. Ordinarily the caster cup consists of a circular or polygonal block or thick disk of glass, porcelain, wood or the like of such diameter as to provide an extended bearing surface on the floor, rug, or asphalt tile, thus preventing damage. Heretofore, there apparently hasn't been any appreciation taken in the manufacture of the caster cups to allow for the moving of the bed or furniture in cleaning, making or re-arrangement of the room without the necessity of rolling the object off the cups; thus allowing damage to the floor when the floor is contacted by the caster and also necessitates the lifting of the bed or furniture to replace the cup in its original position. The object of this invention is to provide a caster cup that will be permanently held in proper position to allow for the moving, cleaning or re-arrangement of the room without moving the object off the cup, thus preventing damage to the floor and eliminating the necessity of re-arranging the cups. This invention also allows the use of the casters should the need arise for them.

The caster cup according to my invention has attaching means carried thereby which allows the caster cup to be secured to a leg of an article of furniture in such a manner as to be selectively positioned so that an associated caster is seated therein or positioned so as to allow said caster to engage the floor. Said attaching means may be mounted on the inside of one of the legs of an article of furniture, such as a bed, thus not impairing the appearance of the article of furniture.

Both forms of my invention include a caster cup 1, which may be of any known type having a floor engaging surface which will allow it to be slid across the floor with a minimum of effort. Secured to the caster cup 1, adjacent the periphery thereof, is a rod 4 having a head portion at the distal end thereof and having a coil type compression spring 2 mounted thereon.

Figure 1:
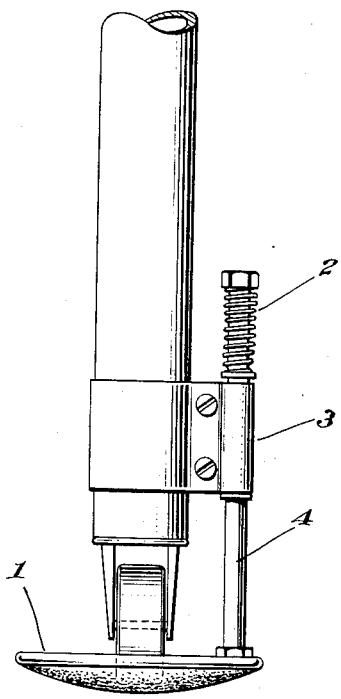
Fig. 1 shows a side view of a first form of my invention, mounted on a metal bed post and with a caster carried by said post positioned within the caster cup.

The form of my invention shown in Fig. 1 also includes a bracket formed from a metal strap 3 which is slidably secured to the rod 4 between the coil spring 2 and the caster cup 1. This metal strap 3 is shown as being secured in clamped relation about a tubular metal post by means of two stove bolts, the metal strap 3 being so located on said post that when the caster cup is positioned below the caster, as shown in Fig. 1, the coil spring 2 will be compressed.

Figure 2:
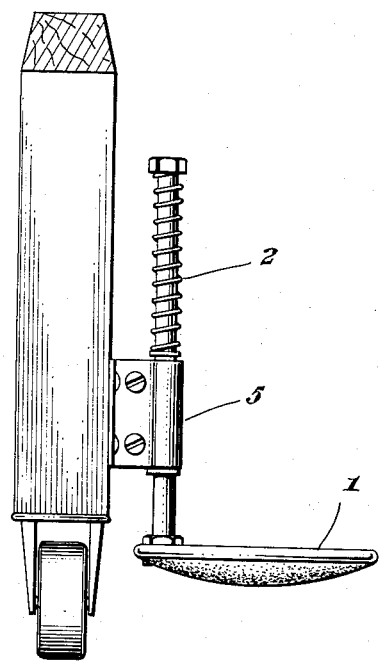
Fig. 2 shows a side view of a second form of my invention, mounted on a wooden post and with the caster cup positioned so as to allow a caster carried by said post to engage the floor.

The form of my invention shown in Fig. 2 includes a bracket in the form of a strap 5 which is slidably secured to the rod 4 between the coil spring 2 and the caster cup 1. This strap 5 is shown as being secured to a wooden post by common wood screws. As in the form of my invention shown in Fig. 1, the strap 5 is secured to the post in such a position that the coil spring 2 will be under compression when the caster cup 1 is positioned beneath the caster.

In both forms of my invention, considering the caster cup as being beneath the caster as shown in Fig. 1, the article of furniture to which my device is secured may be slid along the floor, or floor covering, without removing the caster cup from beneath the caster. However, if it is desired to employ the caster, it is merely necessary to lift the leg of the article of furniture, pull down and turn the caster cup 1 and release the caster cup so that it may be shifted to the position shown in Fig. 2 by means of the coil spring 2.

What I claim as new and desire to secure by Letters Patent is:

In a device of the character described; a caster cup having a smooth lower surface adapted for sliding over a floor or the like and being adapted to support a caster on its upper surface, a cylindrical rod secured by one end thereof to said caster cup adjacent an edge thereof in such a manner as to extend perpendicularly to the floor when the device is in use, a bracket slidably and rotatably secured to said rod, and spring means intertensioned urging said caster cup toward said bracket, said bracket being adapted to be mounted on a post, carrying a caster, in such a position that said caster cup may be positioned below the caster with the caster engaging the upper surface of said caster cup and with said spring in tensioned condition, and in such a position that said caster cup and rod may be rotated with respect to said bracket in such a manner that said caster cup will swing from beneath the caster and said spring will position said caster cup above the lower end of the caster.

References Cited in the file of this patent

UNITED STATES PATENTS

| | | |
|---|---|---|
| 1,284,991 | Beecraft | Nov. 19, 1918 |
| 2,033,207 | Schultz | Mar. 10, 1936 |
| 2,107,629 | Dallas | Feb. 8, 1938 |
| 2,126,811 | Rambo et al. | Aug. 16, 1938 |
| 2,624,469 | Cadwell et al. | Jan. 6, 1953 |

FOREIGN PATENTS

| | | |
|---|---|---|
| 265,765 | Germany | Oct. 15, 1913 |